Figure 1:
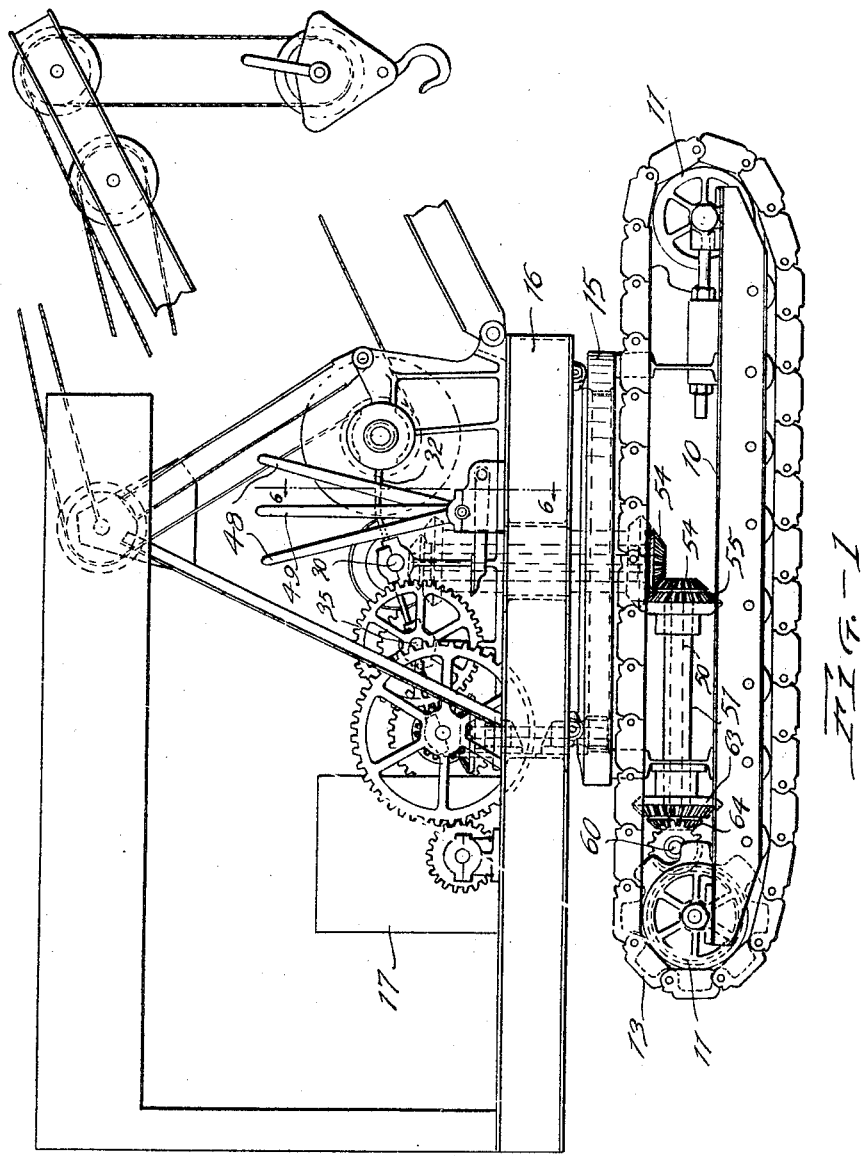

April 22, 1924.

C. U. NORTH 1,491,617

DRIVE MECHANISM FOR TRACTOR BELT CRANES

Filed Oct. 20. 1921

4 Sheets-Sheet 1

INVENTOR
Carl U. North
By Baker Macklin
ATTORNEYS

April 22, 1924.

C. U. NORTH 1,491,617

DRIVE MECHANISM FOR TRACTOR BELT CRANES

Filed Oct. 20, 1921  4 Sheets-Sheet 2

INVENTOR
Carl U. North
BY
Bates & Macklin
ATTORNEYS

April 22, 1924.

C. U. NORTH

DRIVE MECHANISM FOR TRACTOR BELT CRANES

Filed Oct. 20, 1921    4 Sheets-Sheet 3

1,491,617

INVENTOR
Carl U. North
BY
Baker & Moeller,
ATTORNEYS

April 22, 1924.

C. U. NORTH

DRIVE MECHANISM FOR TRACTOR BELT CRANES

Filed Oct. 20. 1921 4 Sheets-Sheet 4

INVENTOR
Carl U. North
By Dakin & Macklin
ATTORNEYS

Patented Apr. 22, 1924.

1,491,617

UNITED STATES PATENT OFFICE.

CARL U. NORTH, OF BAY CITY, MICHIGAN, ASSIGNOR TO INDUSTRIAL WORKS, OF BAY CITY, MICHIGAN, A CORPORATION OF MICHIGAN.

DRIVE MECHANISM FOR TRACTOR BELT CRANES.

Application filed October 20, 1921. Serial No. 509,046.

*To all whom it may concern:*

Be it known that I, CARL U. NORTH, a citizen of the United States, residing at Bay City, in the county of Bay and State of Michigan, have invented a certain new and useful Improvement in Drive Mechanism for Tractor Belt Cranes, of which the following is a full, clear, and exact description, reference being had to the accompanying drawings.

This invention relates more particularly to that class of tractors which are provided with an endless track laying belt, and which are designed for surface travel in contradistinction to those equipped to travel on rails. It also relates to a class of vehicles wherein the traveling element supports a turntable on which work-performing equipment may be mounted.

Turntable cranes mounted on tractor belts have heretofore been used, but considerable difficulty has been experienced in attaining a satisfactory steering mechanism. To accomplish this, various means have been devised and employed, some of which embody a differential gearing and brake mechanism which is positioned near the tractor belts and arranged to be operated by control mechanism mounted on the turntable. In this manner, either belt may be held stationary, or permitted to move at a slower rate of speed than the other. I have found, however, that a system of control embodying such structure necessitates two brakes which are very inaccessible. In addition I have found that it is difficult to secure a straight-line movement if one belt is subjected to greater resistance than the other, as by some obstruction on the road. Furthermore, such design necessitates a complicated arrangement of levers to connect the control mechanism on the turntable with the brakes on the track frame.

Another system for controlling the direction of movement of a tractor type turntable crane involves the use of clutches which are also positioned near the ground and individually connected to each belt. Here, too, it has been found that the control mechanism embodies a complex system of gear segments and levers, for enabling the turntable to make a complete revolution, and at the same time for allowing any one of the belts to be engaged or disengaged for steering purposes. In addition, the location of clutches near the ground, renders them generally inaccessible and difficult to maintain in working order.

In order to overcome the difficulties heretofore experienced in steering a tractor having an endless belt drive, and at the same time to provide a mechanism which operates satisfactorily on a turntable crane, my invention contemplates the provision of positive gearing from the driving platform directly to the tractor belt axles, without employing clutch or brake mechanism on the lower car structure and without having complicated cam or lever connections between the operating platform and the tractor frame. A further feature of my invention is the provision of a rugged, simple and substantial design, in which the operating or control parts are located on the turntable, or "upper works," where they are readily accessible for adjustment and repair.

In carrying out the purposes of my invention, I provide concentric drive shafts which are positioned at the center of rotation of the turntable, and are each detachably geared at the upper end with a source of power, and at the lower end with the respective tractor belts. The brake and clutch mechanisms for controlling the concentric shafts and consequently the operation of one or the other belts, are positioned on the turntable and are therefore rendered accessible.

The means for accomplishing the above features, will be hereinafter more fully described in detail, and the essential characteristics of my invention will be summarized in the claims.

Figure 2:
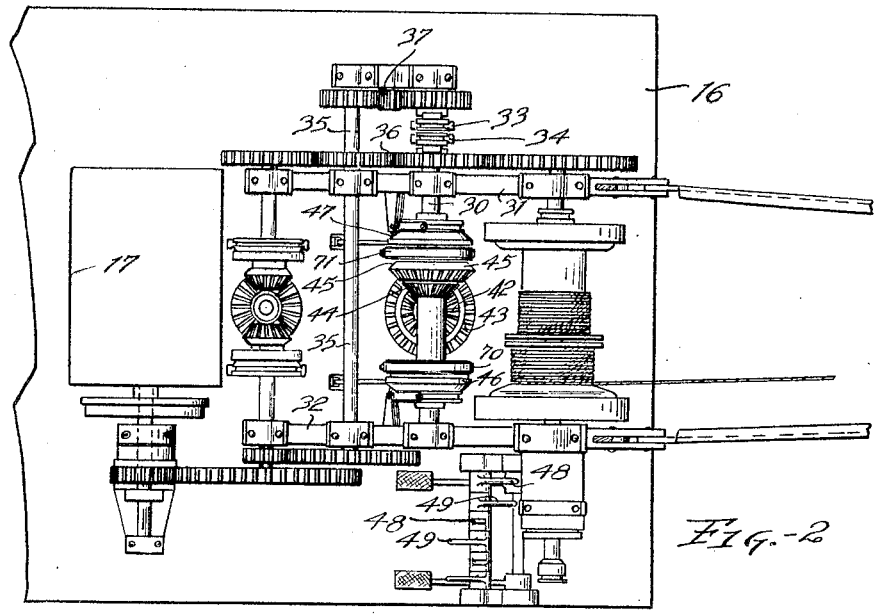
Figure 3:
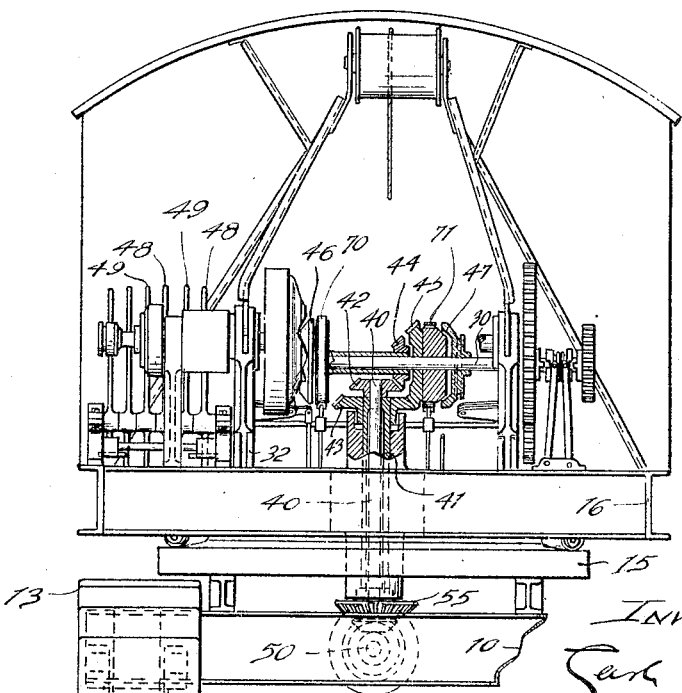
Figure 4:
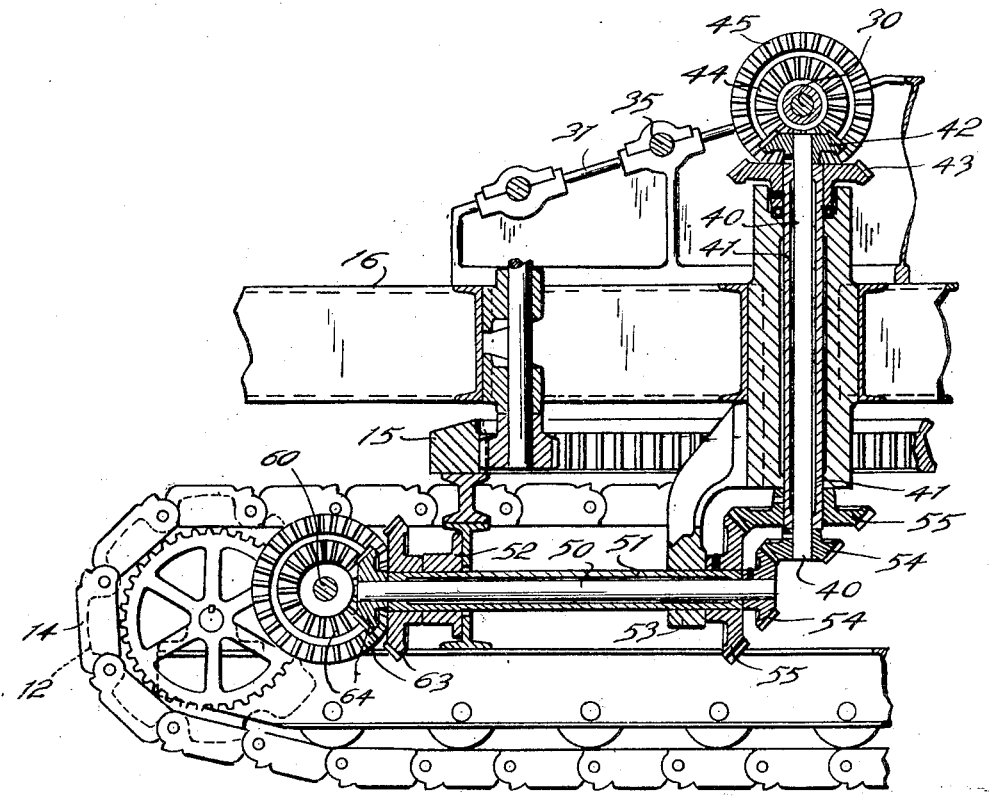
Figure 5:
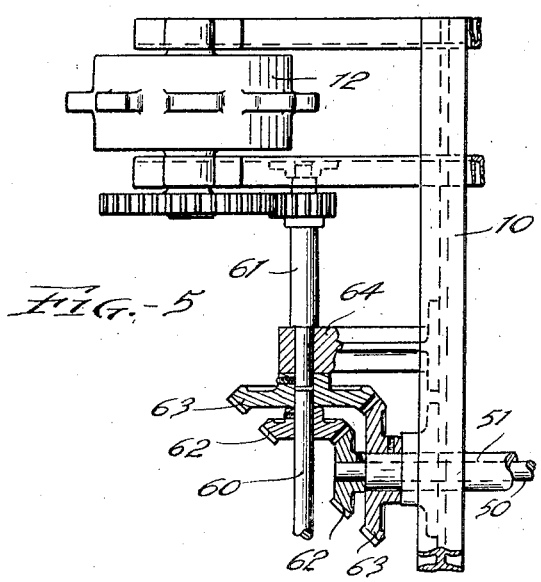
Figure 6:
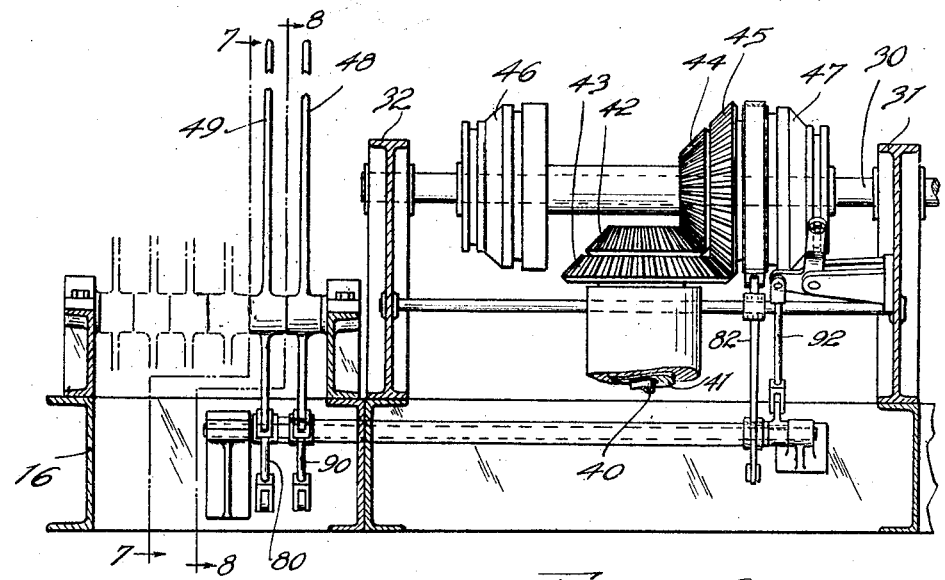
Figures 7, 8:
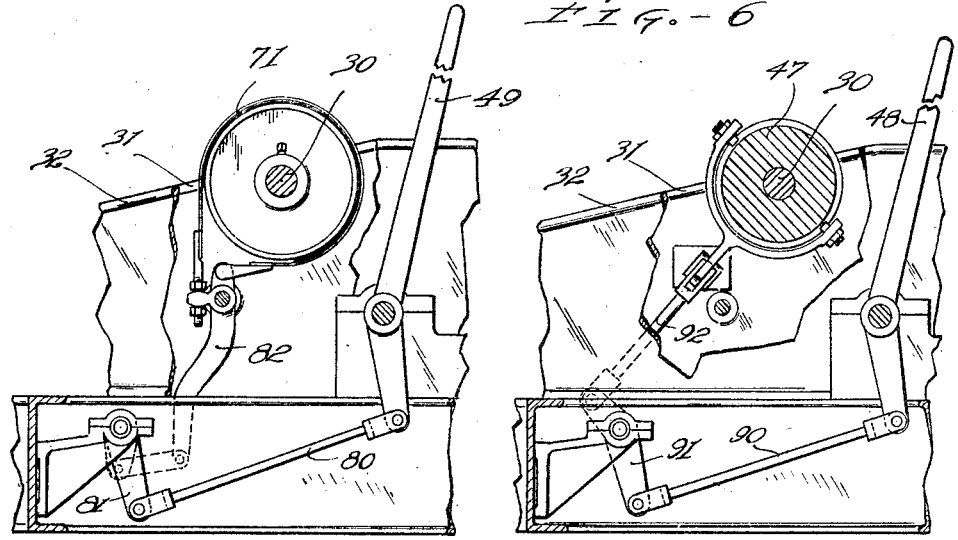

In the drawings, Fig. 1 is an elevation of a locomotive crane mounted on tractor belts and embodying my invention; Fig. 2 is a plan view of the operating and control mechanism for the crane shown in Fig. 1; Fig. 3 is a front elevation, partly in section, of such crane; Fig. 4 is a longitudinal section taken vertically through the crane, and showing the tractor belt drive mechanism; Fig. 5 is a fragmentary elevation, partly in section, of that portion of the drive mechanism adjacent the sprocket wheel; Fig. 6 is a transverse section taken on the line 6—6 in Fig. 1; Figs. 7 and 8 are transverse sections taken on lines 7—7 and 8—8 respectively in Fig. 6, and having portions of the supporting structure broken away to show the brake and clutch operating mechanism.

In the various figures, I have shown my invention as embodied in a locomotive crane which is arranged to be driven by tractor belts disposed on opposite sides of the crane. The tractor illustrated is embodied in a frame 10 which supports sprocket wheels 11 and 12 on which endless belts 13 and 14 respectively are mounted. The frame is also shown as supporting a trackway 15 on which a turntable indicated generally at 16 may be rotated. Above the turntable, I have shown a source of power 17 as embodied in an internal combustion engine which operates through suitable clutches and gearing to rotate the turntable, move the crane, and operate the hoisting drums or other work-performing equipment as desired. My invention as above mentioned, is particularly directed toward the means employed for propelling the crane, and for steering it by mechanism mounted on the turntable frame.

The mechanism for causing the forward movement of the crane is embodied in a transverse shaft 30 which is supported above the turntable by standards 31 and 32 and arranged to be suitably connected by clutches 33 and 34, to a common drive shaft 35 which is shown as being directly geared to the source of power 17. Between the shafts 30 and 35, I provide direct gearing, as at 36, to cause rotation of the shaft 30 in one direction, and I provide an idler gear 37 to cause rotation of such shaft in the opposite direction; such direction of rotation being governed by means of the clutches 33 and 34 respectively.

To transmit power from the transverse shaft 30 to the tractor belts, I provide concentric shafts 40 and 41 which are positioned at the center of rotation of the turntable and which are provided with bevel gears 42 and 43, in mesh with gears 44 and 45 respectively. The gears 44 and 45 are loosely mounted on the shaft 30 and respectively connected with clutches 46 and 47, which in turn are arranged to be selectively operated by the hand levers indicated generally at 48. The lower end of the shafts 40 and 41 are respectively connected by bevel gearing 54 and 55 to concentric shafts 50 and 51 which are supported on the car frame as at 52 and 53.

At the rear end of the car frame, I provide a set of transverse aligned drive shafts 60 and 61 which are connected at one end to the shafts 50 and 51 by bevel gearing 62 and 63 respectively, and at the other end by suitable gearing to sprocket wheels 11 and 12 respectively. In Fig. 5, I have shown the inner end of the shaft 61 as supported in the bearing block 64, and I have shown the inner end of the shaft 60 as supported within the bevel gear 63. This construction however, is capable of modification, this being merely the preferred form.

The transmission mechanism as embodied in the concentric shafts 50 and 51 is designed for use primarily in connection with a turntable crane, wherein the tractor belt sprocket wheels are on either side of the center of rotation. However, the results accomplished may be also attained by positioning the shafts 60 and 61 directly beneath the shafts 40 and 41, and either employing a chain connection to the sprocket wheels or placing such wheels near the center of the tractor belts. Similarly, my invention, so far as it relates to positioning the control mechanism on the operating platform, may be embodied in a tractor which has no turntable. In this case, however, the shafts 40 and 41 need not necessarily be positioned at the center of the tractor belt, but may be placed at any convenient angle to gear directly with the shafts 60 and 61.

The beveled gearing employed for transmitting rotation from the shaft 30 to the sprocket wheels is so designed that the various concentric transmission shafts rotate synchronously whenever the clutches 46 and 47 are in engagement with the gears 44 and 45 respectively. In this way, the crane is caused to move forwardly and in a straight line. If however, it is desired to cause the crane to move in an arc of a circle having a comparatively large radius, then either of the clutches 46 and 47 may be disengaged or slipped, whereupon the speed of one belt is diminished and the desired curve is attained. In order, however, to effect a sharp turn, I provide individual brakes 70 and 71 in connection with clutches 46 and 47 respectively, and I provide suitable control pedals or levers, as at 49, therefor.

In Fig. 6, I have shown a brake operating mechanism as separate from the clutch mechanism and for only the gear 45; however, it is to be understood that a similar mechanism is to be used for controlling the gear 44. In Fig. 7, the brake mechanism is illustrated as embodying a set of levers 80, 81 and 82 for transmitting motion from the operating lever 49 to the brake 71 as will be apparent from the diagram. Similarly, in Fig. 8, the clutch mechanism embodies a set of levers 90, 91 and 92 for shifting the clutch 47. Wherever it is so desired however, a single control lever may be used for operating both the clutch and brake, but this is merely arbitrary in so far as my invention is concerned.

While I have shown my invention in connection with a turntable crane it is obvious that the same results may be accomplished by installing it upon an ordinary tractor wherein no provision is made for the turntable feature. In either case, the control mechanism is positioned on the upper frame work where the brakes and clutches are readily accessible for adjustment or repair, and is positively geared so as to selectively operate the driving belts. A notable feature however, in connection with the turn-table crane is that either or both belts can be operated irrespective of the position of the turntable.

The operation of my invention is as follows:—

Assuming that the drive shaft 30 is connected to the source of power 17, through the gears 37 and clutch 33, and assuming further that the clutches 46 and 47 are in engagement with the gears 44 and 45, then as the shaft 30 rotates, the concentric shafts 40 and 41 rotate simultaneously and synchronously and the truck is propelled in a forward direction. Whenever the shafts 40 and 41 are rotated, the shafts 50 and 51, and the shafts 60 and 61, all being directly connected by bevel gearing, are simultaneously rotated; and since the gears in each set between the drive shaft 30 and the shafts 60 and 61 have the same number of teeth, it follows that the tractor belts 13 and 14 move uniformly. If however, it is desired to turn the crane, say to the left, then the speed of the tractor belt 14 (which is on the left) must be diminished in accordance with the radius of the arc on which the crane is to be turned. This is accomplished by releasing the clutch 47 (also on the left) and applying the brake 71 as desired. Similarly, if the crane is to be turned to the right, the clutch 46 and brake 70 must be operated, to control the movement of the inside shafts 40 and 50, and consequently the speed of the tractor belt 13. To reverse the straight-line direction of travel it is only necessary to disengage the clutch 33 and to engage the clutch 34.

From the foregoing description, it will be seen that I have provided a drive mechanism which enables a vehicle having a tractor belt drive, to be turned on any desired arc of a circle, and even within in its own length. It will further be seen that my invention is capable of use with a structure embodying a turntable frame, and operated effectively therein for steering, irrespective of the turntable position. An advantage of my invention is that manually operated brakes and clutches adjacent the tractor belt, or the surface of travel, are dispended with, and that such manually operable mechanism is positioned adjacent the upper frame structure where it is readily accessible for adjustment and repair.

Having thus described my invention, I claim:—

1. In a truck, the combination with a frame, of tractor belts mounted thereon, a turn-table supported on the frame, a source of power on the turn-table, concentric gearing elements extending through the axis of rotation of the turn-table and connected to said belts, and detachable means on the turn-table connecting the source of power with each of the gearing elements whereby the truck may be steered by selectively controlling the driving gearing.

2. In a truck the combination with a set of tractor belts, of a frame therefor, a turntable mounted on said frame, a source of power on the turn-table for operating the belts, concentric shafts extending through the axis of rotation of the turn-table and connected with a source of power, and means on the turn-table for selectively operating said shafts whereby the truck may be steered through control of the driving members.

3. In combination, a truck, a pair of load supporting belts therefor, a turn-table on the truck, concentric shafts extending through the center of rotation of the table and operatively connected with said belts, and means on the turn-table for selectively controlling the operation of said shafts.

4. In combination, a truck, load supporting belts therefor, a turntable surmounting the truck, a transverse shaft on the turntable, two positive concentric gearing elements between said shaft and said belts, said elements extending through the axis of rotation of said turntable, and means mounted on said shaft and associated with each of said gearing elements for enabling one belt to be moved relatively to the other.

5. In combination, a frame, a pair of tractor belts on opposite sides thereof, a turntable surmounting the frame, a source of power on the turntable, a pair of concentric shafts mounted at the center of rotation on the turntable, means for detachably connecting one end of each shaft with the source of power, and means for positively connecting the other end of each shaft with one of said belts.

6. In combination with a frame, of a pair of tractor belts on opposite sides thereof, a turntable surmounting the frame, a transverse shaft mounted on the turntable, a source of power connected with said shaft, a pair of concentric transmission members at the center of rotation of the turntable, the upper end of each member projecting above the turntable, a clutch carried by said shaft for selectively operating each of said members, and means for providing a positive connection between the lower end of said members and the belts.

7. In a device of the character described, the combination with a pair of tractor belts, of a turntable, concentric drive shafts at the center of rotation of said table, selective control mechanism on said table for operating each shaft, and positive gearing connecting each shaft to one of said belts.

8. In combination, a frame, a pair of tractor belts disposed on opposite sides thereof, transverse aligned shafts each connected to one belt, a turn-table on said frame, a pair of concentric shafts extending through the axis of rotation of the turn table, each of said concentric shafts being positively geared with one of the transverse shafts, and means on the turn-table for selectively operating either of the concentric shafts, whereby one belt may be moved relatively to the other.

9. In combination, a frame, a pair of tractor belts, supported thereby, a turntable surmounting the frame, a source of power on the turntable, a pair of transverse disconnected shafts each geared to one of the belts, a pair of concentric transmission members extending through the axis of rotation of the turn table, each having one end thereof positively geared with one of said shafts, means connecting the other end of the members with the source of power, and means carried by the turntable for selectively operating either of said transmission members whereby one belt may be moved relatively to the other.

10. In combination, a truck frame, a pair of belts carried thereby, a turn-table on said frame, a source of power on the turn-table, a pair of drive shafts one embracing the other, and each extending through the axis of rotation of the turn-table, a clutch for selectively connecting one end of each of said shafts with the source of power, and means for positively connecting the other end of each of said shafts with one of said belts.

11. In combination, a truck frame, a pair of tractor belts therefor, a turntable surmounting the frame, disconnected, aligned shafts geared to said belts, a pair of concentric shafts positioned at the center of rotation of the turntable, positive gearing between each of the concentric shafts and one of the aligned shafts, and means mounted on the turntable for selectively operating said concentric shafts, whereby one belt may be moved relatively to the other.

12. In combination, a truck frame, load supporting belts therefore, a turntable surmounting said frame, a source of power on the turntable, a horizontal drive shaft on the turntable geared to the source of power, concentric vertical shafts at the turntable center, manually operable clutches intermediate the horizontal shaft and each of the vertical shafts, and means for positively connecting each of the vertical shafts with one of said belts.

13. In combination, a truck frame, a pair of load supporting belts carried thereby, a turntable, a source of power thereon, a pair of concentric shafts at the center of rotation of the turntable, a pair of concentric shafts on the frame, the inner shaft on the frame being geared with the inner shaft on the turntable, means for selectively connecting each of the turntable shafts with the source of power, and means for connecting the frame shafts with said belts.

14. In combination, a truck frame, a pair of load supporting tractor belts therefor, a turn-table, a source of power thereon, a pair of vertical concentric shafts carried by the turn-table and mounted at the center of rotation thereof, a pair of concentric horizontal shafts carried by the frame, and extending longitudinally thereof, the two inner shafts being positively connected, and the two outer shafts being positively connected, means for positively connecting each of the horizontal shafts to one of said belts, and means on the turn-table for selectively connecting the vertical shafts with the source of power.

15. In combination with a frame, of a pair of tractor belts on opposite sides thereof, a turn-table surmounting the frame, a source of power carried on the turn-table, a pair of concentric shafts extending through the center of rotation of the turn-table and connected at the upper end thereof with the source of power, another pair of concentric shafts extending longitudinally of the frame, and connected to the tractor belts, one set of bevel gears for connecting the inner shafts, and another set of bevel gears for connecting the outer shafts, and means on the turn-table for selectively connecting the concentric shafts with the source of power for controlling the movement of the belt relatively to the other.

16. In a device of the character described, the combination with a frame, of a pair of tractor belts therefor, a source of power carried by the frame, a pair of concentric shafts extending longitudinally of the frame, means on the turn-table for selectively connecting the forward end of said shafts with the source of power, and means comprising sets of bevel gears for connecting the rear end of said shafts with the belts, the inner shaft being geared with one belt and the outer shaft being geared with the other belt.

17. In combination, a frame, a pair of tractor belts supported thereby, a turntable surmounting the frame, a source of power on the turntable, a pair of transverse disconnected shafts, each geared to one of the belts, a pair of concentric transmission members extending longitudinally of the frame, one set of bevel gears connecting the inner shaft with one of said disconnected shafts, another set of gears connecting the outer shaft with the other of said disconnected shafts, a pair of vertical concentric drive shafts extending through the center of rotation of the turntable, selectively operable means connecting the upper ends of said vertical shafts with the source of power, and bevel gears connecting the lower ends of said shafts with the frame concentric shafts.

18. In combination, a frame, a pair of tractor belts therefor, a turntable surmounting the frame, a source of power on the turntable, a pair of concentric shafts extending through the center of rotation of the turntable, a transverse drive shaft detachably connected with the source of power and having the axis thereof in a plane with the axes of the concentric shafts, means on the turn-table for selectively connecting said transverse shaft with each of the concentric shafts, and means connecting the lower ends of the concentric shafts with said belts.

19. In combination, a frame, a pair of tractor belts therefor, a turntable surmounting the frame, a pair of concentric shafts extending through the center of rotation of the turntable and connected at lower ends thereof with the belts, a source of power on the turntable, a transverse shaft having the axis thereof in a plane with the axes of the concentric shafts, means for connecting the transverse shaft with the source of power, a set of bevel gears connecting the transverse shaft with the outer concentric shafts, a clutch associated with one of said gears, another set of bevel gears connecting the transverse shaft with the inner concentric shaft, the hub of one of said gears comprising an elongated sleeve, and a clutch associated with said sleeve.

20. In combination, a truck frame, a pair of tractor belts therefor, a turn-table on said frame, a source of power carried by the turntable, a pair of concentric shafts connecting the source of power through the turn-table axis of rotation with the belts, means on the turn-table associated with each of said shafts for selectively operating one belt relatively to the other, and reversing mechanism connected to one of said shafts.

21. In combination, a truck frame, a pair of tractor belts therefor, aligned independently operable shafts connected with the belts, a pair of concentric shafts mounted on the frame, a turntable surmounting the frame, a source of power on the turntable, a pair of concentric shafts extending through the center of rotation of the turntable, another pair of concentric shafts extending transversely of and above the turntable and having the axes thereof in a plane with the axes of the vertical shafts, set of bevel gears connecting all of the inner shafts, other sets of bevel gears connecting all of the outer shafts, and means mounted on the turntable for detachably connecting the source of power with either set of shafts.

22. In combination, a truck frame, a pair of tractor belts disposed on opposite sides thereof, a turntable surmounting the frame, a source of power on the turntable, pair of concentric shafts extending through the axis of rotation of the turn-table, and connecting the source of power with the belts, a clutch mounted above the frame for detachably connecting all of the inner shafts with one of said belts, another clutch for detachably connecting the outer shafts with the other of said belts, and reversing mechanism associated with one of the inner shafts.

23. In combination, a truck frame, a pair of tractor belts therefor, a turntable rotatably mounted on the frame, a source of power on the turntable, means connecting the source of power with the tractor belts, and brakes mounted on the turntable for selectively controlling the transmission mechanism leading to each belt.

24. In combination, a frame, a pair of tractor belts disposed on opposite sides thereof, a turntable, a source of power on the turntable, means for transmitting power to the belts, said means comprising concentric shafts positioned at the center of rotation of the turntable, and a brake operatively connected to each of said shafts, said brakes being positioned above the turntable.

In testimony whereof, I hereunto affix my signature.

CARL U. NORTH.